(12) United States Patent
Lecue et al.

(10) Patent No.: US 12,664,569 B2
(45) Date of Patent: Jun. 23, 2026

(54) SYSTEMS AND METHODS FOR GENERATING STRUCTURED DATASETS FOR PREDICTING BOND PRICE WITH IMPROVED ACCURACY

(71) Applicant: JPMorgan Chase Bank, N.A., New York, NY (US)

(72) Inventors: Freddy Lecue, Mamaroneck, NY (US); Leonidas Tsepenekas, College Park, MD (US); Daniele Magazzeni, London (GB); Yibei McDermott, West New York, NJ (US); Jackie Ho, New York, NY (US); Barney O'Kane, Darien, CT (US); Sebastian Tudor, Hoboken, NJ (US); Andreas Koukorinis, London (GB)

(73) Assignee: JPMorgan Chase Bank, N.A., New York, NY (US)

( * ) Notice: Subject to any disclaimer, the term of this patent is extended or adjusted under 35 U.S.C. 154(b) by 41 days.

(21) Appl. No.: 18/405,620

(22) Filed: Jan. 5, 2024

(65) Prior Publication Data

US 2025/0166028 A1 May 22, 2025

(30) Foreign Application Priority Data

Nov. 20, 2023 (GR) .............................. 20230100959

(51) Int. Cl.
*G06Q 40/00* (2023.01)
*G06F 17/18* (2006.01)

*G06Q 30/0283* (2023.01)
*G06Q 40/04* (2012.01)

(52) U.S. Cl.
CPC ......... *G06Q 30/0283* (2013.01); *G06F 17/18* (2013.01); *G06Q 40/04* (2013.01)

(58) Field of Classification Search
None
See application file for complete search history.

(56) References Cited

U.S. PATENT DOCUMENTS

2022/0383152 A1* 12/2022 Kallur Palli Kumar ....................
 G06N 7/01
2024/0232696 A1* 7/2024 Dervovic ............... G06N 3/045
2024/0273382 A1* 8/2024 Tsepenekas ........... G06N 5/022
2025/0037158 A1* 1/2025 Lecue ............... G06Q 30/0206

* cited by examiner

*Primary Examiner* — Olabode Akintola
(74) *Attorney, Agent, or Firm* — Guntin & Gust, PLC; Atan Das

(57) ABSTRACT

Aspects of the subject disclosure may include, for example, systems and methods for generating structured datasets for predicting bond price. The systems and methods include constructing a price function of each bond contained in a plurality of bond clusters including a target cluster, training a machine learning model to determine a cause for an erroneous price prediction result, and generating structured datasets based on a feedback from the machine learning model. Other embodiments are disclosed.

20 Claims, 7 Drawing Sheets

100

100

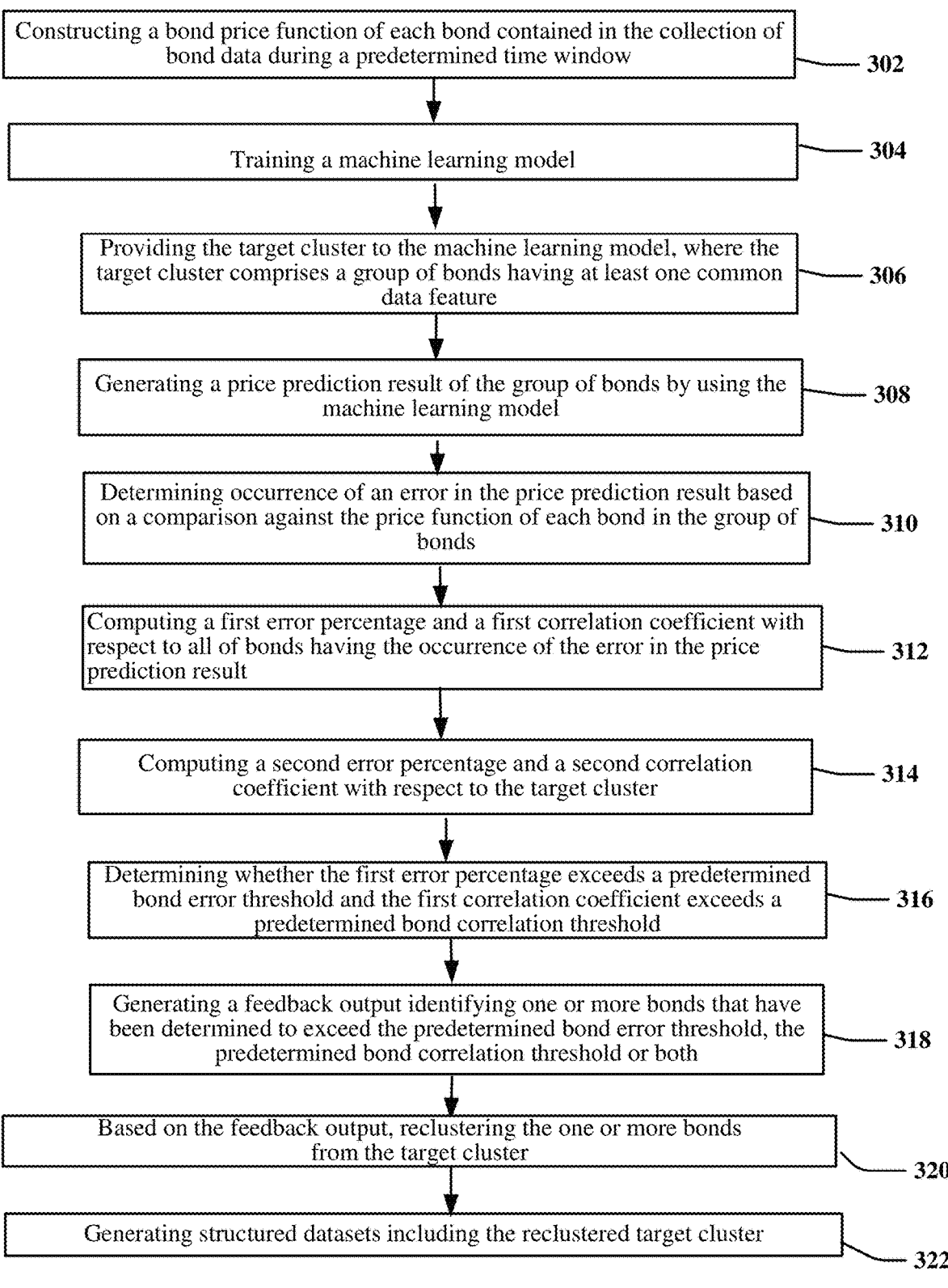

Constructing a bond price function of each bond contained in the collection of bond data during a predetermined time window — 302

Training a machine learning model — 304

Providing the target cluster to the machine learning model, where the target cluster comprises a group of bonds having at least one common data feature — 306

Generating a price prediction result of the group of bonds by using the machine learning model — 308

Determining occurrence of an error in the price prediction result based on a comparison against the price function of each bond in the group of bonds — 310

Computing a first error percentage and a first correlation coefficient with respect to all of bonds having the occurrence of the error in the price prediction result — 312

Computing a second error percentage and a second correlation coefficient with respect to the target cluster — 314

Determining whether the first error percentage exceeds a predetermined bond error threshold and the first correlation coefficient exceeds a predetermined bond correlation threshold — 316

Generating a feedback output identifying one or more bonds that have been determined to exceed the predetermined bond error threshold, the predetermined bond correlation threshold or both — 318

Based on the feedback output, reclustering the one or more bonds from the target cluster — 320

Generating structured datasets including the reclustered target cluster — 322

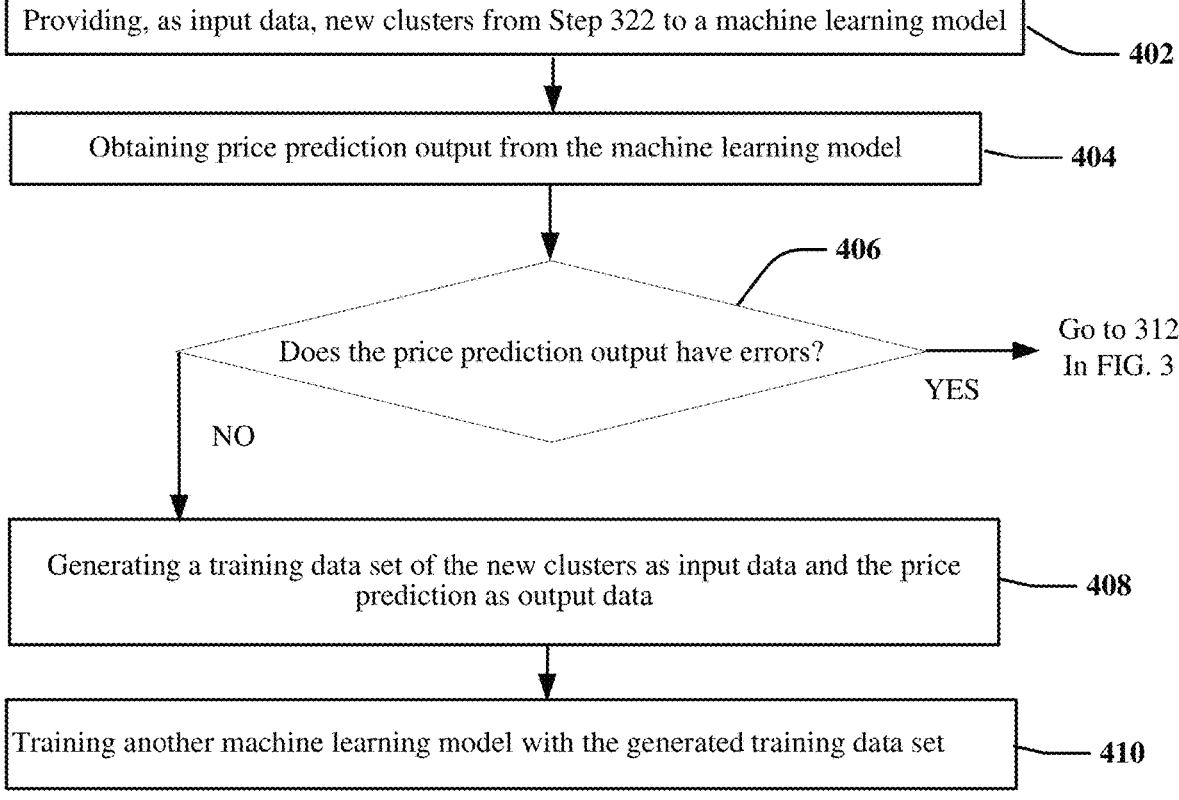

Providing, as input data, new clusters from Step 322 to a machine learning model — 402

Obtaining price prediction output from the machine learning model — 404

406

Does the price prediction output have errors?

YES → Go to 312 In FIG. 3

NO

Generating a training data set of the new clusters as input data and the price prediction as output data — 408

Training another machine learning model with the generated training data set — 410

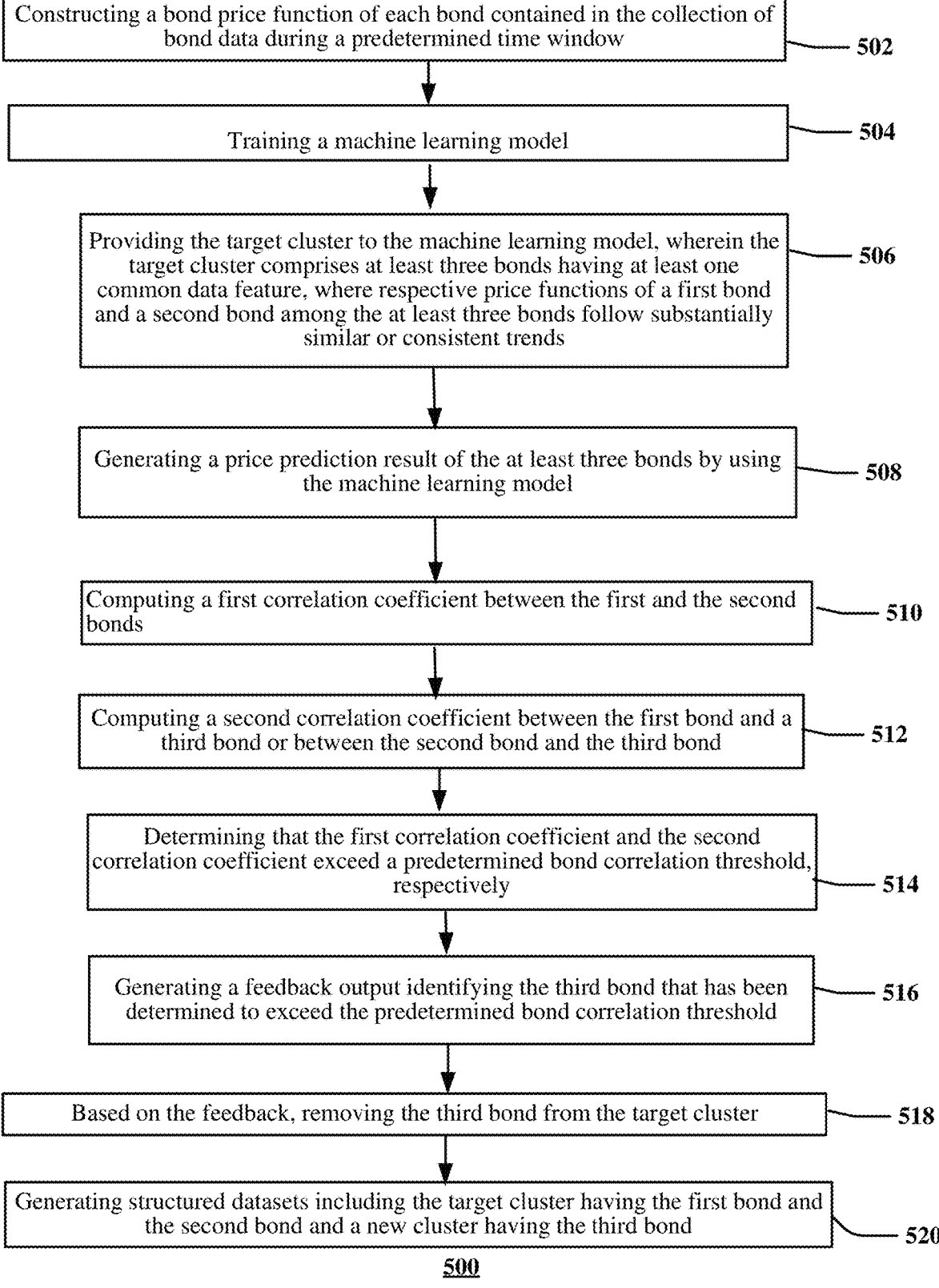

Constructing a bond price function of each bond contained in the collection of bond data during a predetermined time window — 502

Training a machine learning model — 504

Providing the target cluster to the machine learning model, wherein the target cluster comprises at least three bonds having at least one common data feature, where respective price functions of a first bond and a second bond among the at least three bonds follow substantially similar or consistent trends — 506

Generating a price prediction result of the at least three bonds by using the machine learning model — 508

Computing a first correlation coefficient between the first and the second bonds — 510

Computing a second correlation coefficient between the first bond and a third bond or between the second bond and the third bond — 512

Determining that the first correlation coefficient and the second correlation coefficient exceed a predetermined bond correlation threshold, respectively — 514

Generating a feedback output identifying the third bond that has been determined to exceed the predetermined bond correlation threshold — 516

Based on the feedback, removing the third bond from the target cluster — 518

Generating structured datasets including the target cluster having the first bond and the second bond and a new cluster having the third bond — 520

SYSTEMS AND METHODS FOR GENERATING STRUCTURED DATASETS FOR PREDICTING BOND PRICE WITH IMPROVED ACCURACY

PRIORITY CLAIM

This application claims priority under 35 U.S.C. § 119 from Greek Patent Application No. 20230100959, filed Nov. 20, 2023, the disclosure of which is incorporated herein by reference in its entirety.

FIELD OF THE DISCLOSURE

The subject disclosure relates to systems and methods for generating structured datasets for predicting bond price with improved accuracy and expanded coverage.

BACKGROUND

In trading financial assets, artificial intelligence (AI) models support traders. AI models are trained by using machine learning techniques. Machine learning techniques are applied to accommodate trading strategies which include rules or policies that traders use in making buying or selling decisions of stocks, bonds, and other financial instruments. It is desirable to provide systems and methods for predicting bond price with improved accuracy and with expanded bond coverage.

BRIEF DESCRIPTION OF THE DRAWINGS

Reference will now be made to the accompanying drawings, which are not necessarily drawn to scale, and wherein:

FIG. 3B depicts an illustrative embodiment of a method in accordance with various aspects described herein.

FIG. 4 depicts an illustrative embodiment of another method in accordance with various aspects described herein.

FIG. 5 depicts an illustrative embodiment of further another method in accordance with various aspects described herein.

DETAILED DESCRIPTION

Figure 1:
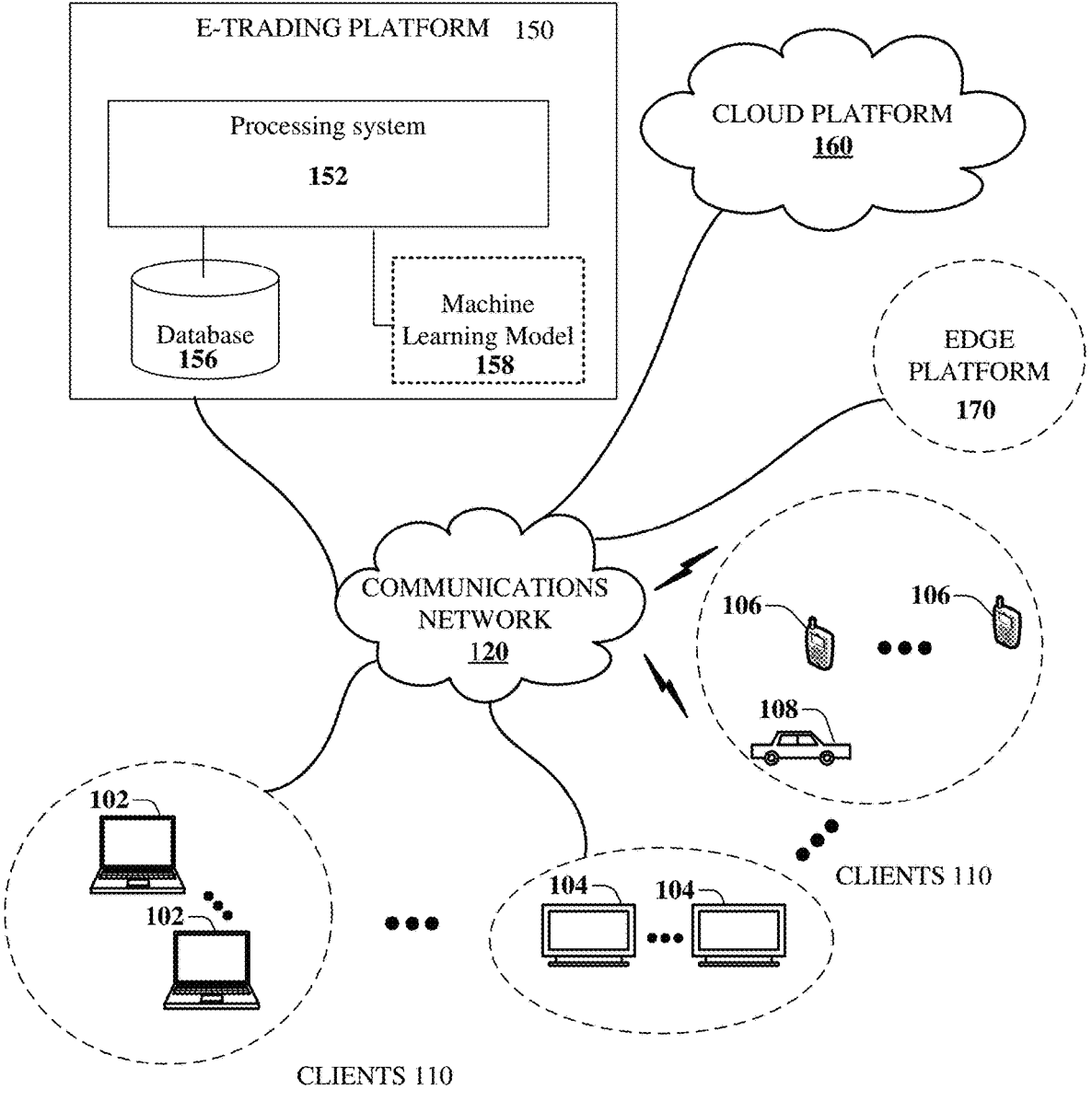
FIG. 1 is a block diagram illustrating an exemplary, non-limiting embodiment of a computer implemented system facilitating electronic trading in accordance with various aspects described herein.

The subject disclosure describes, among other things, illustrative embodiments for systems and methods for generating structured datasets that are used to predict bond price with improved accuracy. Additionally, the systems and methods determine causes for lack of coverage for relevant bonds or errors in generating price prediction results. The systems and methods are further configured to combine unsupervised machine learning and supervised machine learning to extract and compute the causes for lack of coverage or errors. The systems and methods are adapted to machine learning training processes which may converge to result in better coverage and less or no errors. Other embodiments are described in the subject disclosure.

One or more aspects of the subject disclosure include a non-transitory machine-readable medium, comprising executable instructions that, when executed by a processing system including a processor, facilitate performance of operations. The operations include constructing a price function of each bond contained in a plurality of bond clusters including a target cluster during a predetermined time window, training a machine learning model, and generating structured datasets including the reclustered target cluster. The training the machine learning model further includes providing the target cluster to the machine learning model, where the target cluster comprises a group of bonds having at least one common data feature, generating a price prediction result of the group of bonds by using the machine learning model, determining occurrence of an error in the price prediction result based on a comparison against the price function of each bond in the group of bonds, computing a first error percentage and a first correlation coefficient with respect to all of bonds having the occurrence of the error in the price prediction result, computing a second error percentage and a second correlation coefficient with respect to the target cluster, determining whether the first error percentage exceeds a predetermined bond error threshold and the first correlation coefficient exceeds a predetermined bond correlation threshold, and generating a feedback output identifying one or more bonds that have been determined to exceed the predetermined bond error threshold, the predetermined bond correlation threshold or both.

One or more aspects of the subject disclosure are directed to a method including constructing, by a processing system including a processor, a price function of each bond contained in a plurality of bond clusters including a target cluster during a predetermined time window, training, by the processing system, a machine learning model, based on the feedback output by the machine learning model, reclustering, by the processing system, the one or more bonds from the target cluster and generating one or more new clusters including the reclustered one or more bonds, and generating, by the processing system, structured datasets including the reclustered target cluster and the one or more new clusters. The training the machine learning model further includes providing the target cluster to the machine learning model, where the target cluster comprises a group of bonds having at least one common data feature, generating a price prediction result of the group of bonds by using the machine learning model, determining occurrence of an error in the price prediction result based on a comparison against the price function of each bond in the group of bonds, computing a first error percentage and a first correlation coefficient with respect to all of bonds having the occurrence of the error in the price prediction result, computing a second error percentage and a second correlation coefficient with respect to the target cluster, determining whether the first error percentage exceeds a predetermined bond error threshold and the first correlation coefficient exceeds a predetermined bond correlation threshold, and generating a feedback output identifying all of bonds that have been determined to exceeded the predetermined bond error threshold, the predetermined bond correlation threshold or both.

One or more aspects of the subject disclosure are directed to a device including a processing system including a processor, and a memory that stores executable instructions that, when executed by the processing system, facilitate performance of operations. The operations include constructing a price function of each bond contained in a target cluster during a predetermined time window, training a machine learning model, based on the feedback output, removing the third bond from the target cluster, and generating structured datasets including the target cluster having the first bond and the second bond and a new cluster having the third bond. The training the machine learning model further includes providing the target cluster to the machine learning model, where the target cluster comprises at least three bonds having at least one common data feature, wherein respective price functions of a first bond and a second bond among the at least three bonds follow substantially similar trends, generating a price prediction result of the at least three bonds by using the machine learning model, computing a first correlation coefficient between the first and the second bonds, computing a second correlation coefficient between the first bond and a third bond or between the second bond and the third bond, determining that the first correlation coefficient and the second correlation coefficient exceed a predetermined bond correlation threshold, respectively, and generating a feedback output identifying the third bond that has determined to exceed the predetermined bond correlation threshold.

Bonds are IOUs ("I Owe You") that are traded on the open market. An IOU is a written acknowledgment of debt that one party owes another. Investment grade bonds (IG) come with high Standard and Poor's rating (S&P rating). There are two types of transactions relating to bonds. A first type is "Bid-RFQ (Request for Quote)" which corresponds to buying a bond that is on sale. A second type is "Offer-RFQ" which corresponds to selling one of bonds owned by a bond owner or entities, etc.

Financial entities handle vast amounts of bond trading, on a daily basis. To support large volume trading, electronic trading ("E-trading"), assisted and facilitated by computerized systems via communications networks, is frequently used. Additionally, E-trading uses machine learning to predict a fair market value of each bond to assist traders and facilitate bond trading. For instance, several machine learning models make predictions which can be aggregated into one suggestion and provided to traders. It is highly desirable to obtain accurate predictions as the accurate prediction can lower a risk associated with the trading and increases a profit from the trading. An overall goal of the trading is to avoid buying a bond at a high price in the context of a bid and to avoid selling a bond at a lower price in the context of an offer.

FIG. 1 is a block diagram illustrating an exemplary, non-limiting embodiment of a computer implemented system 100 that facilitates e-trading. The system 100 includes an e-trading platform 150 that provides e-trading capabilities to clients 110. The clients 110 include various computer equipment in different forms 102, 104, 106 and 108. Various computer equipment are used by traders which can be associated with enterprises, institutions or individuals. The clients 110 and the e-trading platform 150 communicate through a communications network 120. In various embodiments, the communications network 120 can include wired, optical and/or wireless links. The communications network 120 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

The e-trading platform 150 can be located at a physical location, such as a central data center, a data processing facility, etc. Additionally, or alternatively, the e-trading platform 150 can be implemented on a cloud platform 160. In particular, the cloud platform 160 is presented as a virtualized communication network that can be used to implement some or all of the subsystems and functions of system, and method presented in the e-trading platform 150. For example, the virtualized communication network can facilitate in whole or in part the e-trading platform 50.

In particular, a cloud networking architecture leverages cloud technologies and supports rapid innovation and scalability via a transport layer, a virtualized network function cloud and/or one or more cloud computing environments which are implemented in the cloud platform 160. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In various embodiments, the e-trading platform 150 may be distributed geographically or at various network locations in a form of an edge platform 170. The edge platform 170 includes networks and devices at or near users and enables processing of requests from users to be performed faster and manage higher volumes or traffic. Although shown as a single element in FIG. 1 for simplicity, several edge platforms 170, can be deployed as needed in order to accommodate traffic.

In various embodiments, the e-trading platform 150 includes a processing system 152 including a processor and a memory, a database 156, and a machine learning model 158. The database 156 include various datasets relevant and useful for e-trading. By way of example only, the database 156 may include historical market data such as stock price and volume, bond price and volume, etc. The database 156 may store other relevant information such as patterns, historical events impacting market conditions, market and financial instruments analysis, etc.

In various embodiments, the e-trading platform 150 further includes the machine learning model 158. The machine learning model 158 may include one or more AI prediction models to predict price of financial assets such as stock, bond, etc. The present disclosure is related to predicting bond price and the description is directed to price prediction of bonds. However, the present disclosure is not limited thereto and can be used in connection with different types of financial instruments or assets when appropriate.

In various embodiments, machine learning techniques are used to facilitate and support large volume trading by traders on a daily basis. Machine learning algorithms can automate repetitive and time-consuming tasks in the trading field and perform tasks such as analyzing market data, identifying patterns, and supporting buy or sell decision making processes. A trader can use machine learning algorithms to automate the process of technical analysis of particular bonds by enabling the algorithms to analyze historical market data and identify patterns such as trends. This can help the trader to make better decisions about when to buy and sell a particular bond.

In various embodiments, machine learning techniques used for trading can be based on supervised learning, unsupervised learning, or both. Supervised learning trains an algorithm using labeled data. The labeled data means that the outcome or label of the data is available. The labeled data includes a well-defined structure and patterns. The supervised learning trains the algorithm to generate a predicted output based on the labeled data.

In bond trading, supervised learning machine learning techniques train the algorithm based on bond prices, trading volume, etc. The algorithm learns the relationship between inputs and outputs, which indicates the price trend of bonds. The trained algorithm can predict future bond price trends based on current bond markets as inputs. Although the supervised learning machine learning techniques can operate well based on the trained data, unexpected or irregular changes or conditions which happens frequently in the trading market, may not be well accommodated by the operation of the algorithm trained by the supervised learning machine learning techniques.

Unsupervised learning machine learning techniques train an algorithm based on unlabeled or unstructured or not well organized data. For the unlabeled data, the outcome or label of the data is not available. Contrary to the supervised learning machine learning techniques, unsupervised learning is used to identify patterns, clusters, or anomalies in the data as the data is not well defined. Unsupervised learning algorithms may not be as good as supervised learning algorithms in making predictions.

In some embodiments, the machine learning model 158 may include a Hidden Markov Model (HMM), Deep Neural Network or Tree-based ensemble techniques. The HMM is a statistical model that uses a Markov process to understand unobservable, i.e., hidden states. As well appreciated in the relevant technical field, the HMM requires an observable process having outcomes to be influenced by the outcomes of the Markov process in a known way. In some embodiments, applying or using the HMM to bond price prediction may result in a relatively limited coverage of bonds. By way of example only, as the HMM is highly complicated and intricate, the HMM may present a lower level of accuracy or a higher level of errors in price prediction with respect to a few bonds. In that case, the HMM may not be available to work with some bonds. In case where these bonds are grouped in a cluster, the HMM may not work as to the cluster and the rest of bonds in the cluster. Accordingly, it is desirable to improve accuracy of the bond price prediction by the HMM and increase a number or percentage of bonds for which the HMM can make predictions.

Figure 2:
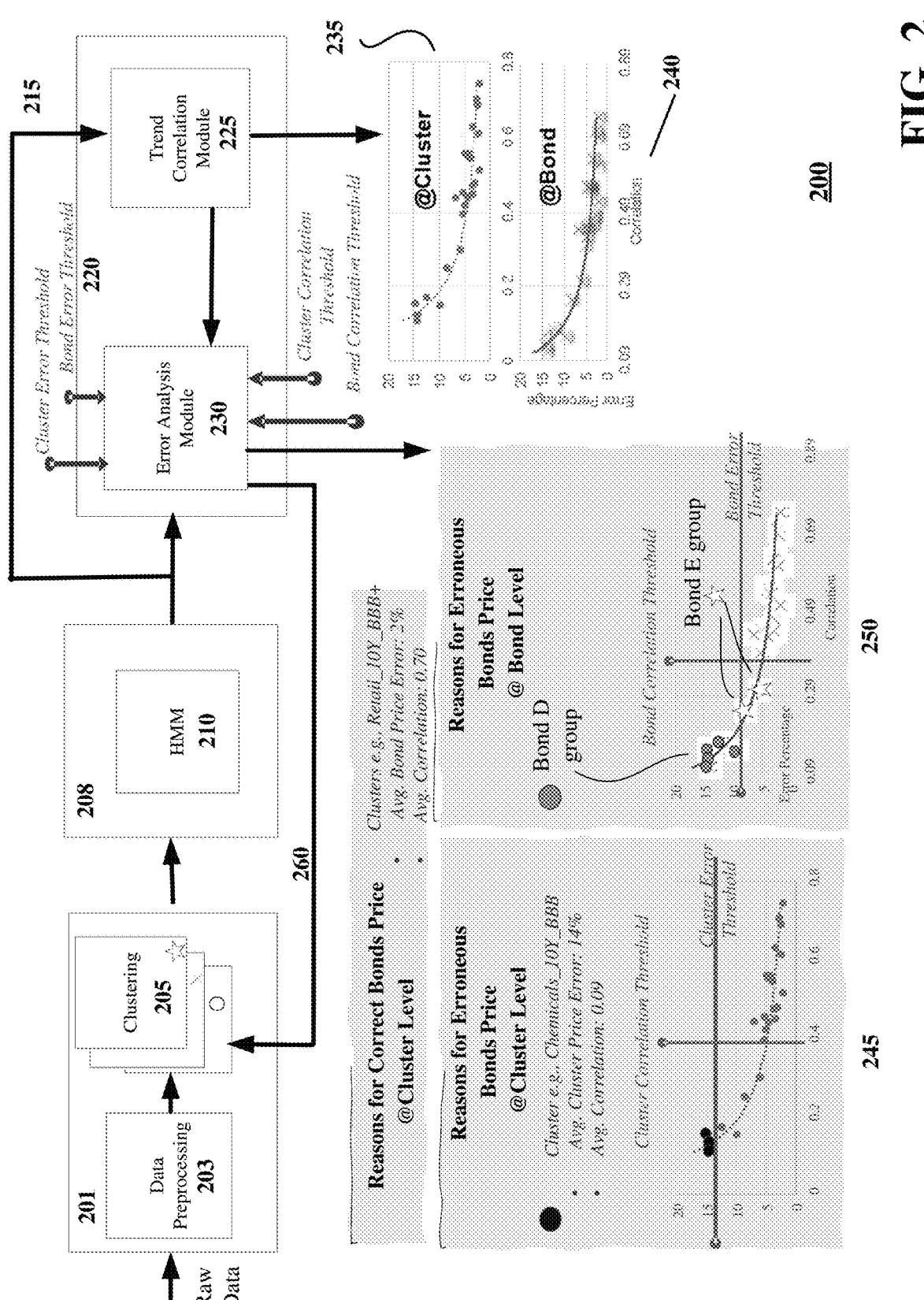
FIG. 2 is a block diagram illustrating an exemplary, non-limiting embodiment of a system in accordance with various aspects described herein.

FIG. 2 is a block diagram illustrating an exemplary, non-limiting embodiment of a system 200 in accordance with various aspects described herein. The system 200 implements a machine learning based platform that generates structured datasets. The system 200 is configured to determine erroneous performance indicators of the HMM based on training input data. The system 200 is further configured to determine causes of the erroneous performance indicator and correct the input data. Accordingly, the system 200 is configured to generate structured datasets and provide such datasets to the HMM, thereby improving bond price prediction performance of the HMM in terms of accuracy and coverage.

In various embodiments, the system 200 includes a data preparation block 201, a machine learning block 208, and a prediction analysis and processing block 220. Raw data are provided to the data preparation block 201. The raw data include and represent a collection of bond data having a plurality of features. Each bond in the collection includes a plurality of data fields. By way of example, a particular bond is identified and associated with various features, such as Name (e.g., YARNO), Maturity Date (e.g., Nov. 14, 2032), Industry Sector (e.g., Basic Materials), Industry Group (e.g., Chemicals), S&P Rating (e.g., BBB), and Tenor Group (e.g., 10Y).

The collection of bond data is received as the raw data and subject to data preprocessing 203 in order to extract one or more features from the plurality of data fields. In some embodiments, the collection of bond data may be identified, sorted and/or stored based on the extracted features such as maturity dates, industry groups, S&P ratings, etc. As a result of the data preprocessing, the collection of bond data is partitioned into clusters 205. The clusters 205 includes a first set of clusters 205 that correspond to preliminary or initial clusters. The first set of clusters 205 may be considered as unlabeled datasets or unstructured datasets. In some embodiments, the first set of clusters may be constructed based on static ad-hoc rules. The first set of clusters may aim to capture similarity in trading trends. Alternatively, the first set of clusters may be constructed manually and electronically stored as the clusters 205. Additionally, or alternatively, the first set of clusters may be constructed by using the extracted features from the data fields associated with the collection of bond data. By way of example only, the clusters 205 can include a first cluster labeled "Retail_10Y_BBB+", a second cluster labeled "Chemicals_10Y_BBB", etc. The first cluster is constructed for gathering bonds from a group of retail bonds having a 10 year maturity date and an S&P rating of BBB+. The second cluster is constructed for gathering bonds from a group of chemical bonds having a 10 year maturity date and an S&P rating of BBB.

As described above, the first set of clusters may be constructed based on static ad-hoc rules. For instance, although all bonds included in the first cluster share the three features of the industry group, the maturity year, and the S&P rating, at least some of bonds may have features that are substantially different from the rest of bonds in the first cluster or can be outliers. Likewise, at least some of bonds included in the second cluster may have some differences or can be outliers, although several features are shared. Such differences or a presence of outliers in the first set of clusters may impact performance of the HMM 210 and accuracy of price prediction results.

More importantly, one or more bonds in the first cluster or in the second cluster may have different price functions. With respect to each bond included in the collection of bond data, a price function is constructed during a predetermined time window, such as two weeks. Some bonds in the same cluster may present similar price functions, whereas other bonds in the same cluster may present different price functions. For the time window of interest, the price function can be constructed using pricing tools available in the relevant technical fields by setting a frequency such as every thirty minutes. Then the pricing tools provide bond price at the requested time and a resulting list of such prices at different times can form a price function.

Figure 3A:
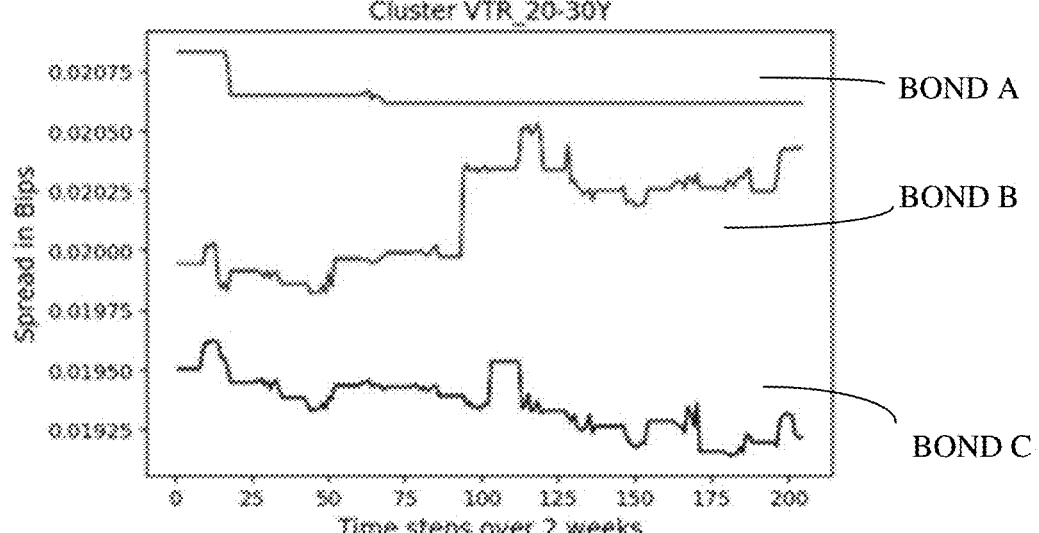
FIG. 3A illustrates an exemplary, non-limiting cluster of a group of bonds in accordance with various aspects described herein.

By way of example, FIG. 3A illustrates an example cluster including Bond A, Bond B, and Bond C. The price functions of Bond B and Bond C substantially follow a similar trend in a majority part of the predetermined time window. However, the price function of Bond A is significantly departed from those of Bonds B and C. Although Bonds A, B and C share certain features such as the maturity date (20~30 years), the target cluster containing Bonds A, B and C may not present a higher level of correlation, particularly in light of the presence of Bond A in this cluster. Accordingly, FIG. 3A illustrates one example of a poor quality bonds clustering which will potentially affect the performance of the HMM 210.

Referring back to FIG. 2, the machine learning block 208 is trained by using the first set of clusters. The first set of clusters is provided to the machine learning block 208. In some embodiments, the machine learning block 208 includes the Hidden Markov Model (HMM) 210 which predicts price of various bond grouped in the clusters 205. By using the example above, the HMM 210 is configured to predict price of the first cluster, "Retail_10Y_BBB+" and the second cluster, "Chemicals_10Y_BBB." Currently available structure, configurations and operations of the HMM 210 can be used to implement the HMM 210.

Price prediction results are output from the machine learning block 208 to the prediction analysis and processing block 220. In some embodiments, the prediction analysis and processing block 220 includes a trend correlation module 225 and an error analysis module 230. The trend correlation module 225 analyzes the price prediction results from the machine learning block 208 and determines whether there are errors associated with the price prediction results. Upon determination of errors, such information is provided to the error analysis module 230 for further analysis of causes.

In some embodiments, the trend correlation module 225 and the error analysis module 230 determine and analyze errors and identify or determine causes why the determined errors are generated. More specifically, the error analysis module 230 determines and identifies a level of intra-cluster correlation of a cluster based on a performance of the HMM with respect to the cluster. As described above, one or more clusters associated with the determined errors may contain bonds that have significant differences or are outliers which potentially impacts performances of the HMM 210 and result in errors in the price prediction. The correlation level of bonds in such clusters will likely be low and reconstructing the clusters may improve price prediction accuracy.

As depicted in FIG. 2, the price prediction results by the HMM 210 are provided to the trend correlation module 225 (see 215 in FIG. 2). In some embodiments, the trend correlation module 225 determines whether one or more price prediction errors have occurred or not at a cluster level and a bond level. The trend correlation module 225 compares each of the price prediction results with the price function of each bond to determine occurrence of one or more price prediction errors. For one or more bonds that have been determined to have the occurrence of the one or more prediction errors, the trend correlation module 225 computes an error percentage for each bond as follows:

$$\text{Error } \% = \frac{[\text{Real Value} - \text{Prediction Value}]}{\text{Real Value}} \times 100 \qquad \text{Equation I}$$

The trend correlation module 225 is further configured to determine correlation at the bond level and the cluster level in order to identify a relationship between the HMM performance and the intra-cluster correlation. The HMM performance is associated with accuracy in bond price prediction and the extent of bond coverage. The intra-cluster correlation indicates how much each cluster is coherently structured to include correlated bonds in that cluster.

In some embodiments, the trend correlation module 225 generates and stores a first correlation graph at a cluster level 235 and a second correlation graph at a bond level 240. The first correlation graph 235 shows a relationship between a model performance and intra-cluster correlation. As depicted in FIG. 2, the first correlation graph 255 shows the intra-cluster correlation in an X-axis and a price error rate or percentage in a Y-axis. The second correlation graph 240 at the bond level also shows a correlation between a pair of bonds in a cluster in an X-axis and a price error rate or percentage in a Y-axis.

In some embodiments, the trend correlation module 225 is configured to compute a correlation coefficient on prices. For instance, the trend correlation module 225 computes a Pearson correlation coefficient ($\rho$) on prices. A Pearson correlation coefficient ($\rho$) on price is calculated for each pair of bonds. In statistics, the Pearson correlation coefficient ($\rho$) is a correlation coefficient that measures linear correlation between two sets of data. The Pearson correlation coefficient ($\rho$) corresponds to the ratio between the of two variables and the product of their standard deviations. The result has a value covariance between −1 and 1. By way of example, if a pair of bonds have the exact same price trend, then the Pearson correlation coefficient would be 1. If the Pearson correlation coefficient ($\rho$) is close to zero, then the pair of bonds have more independent price trends. If the Pearson correlation coefficient is closer to −1, prices of the pair of bonds are more negatively correlated.

Using the above example in FIG. 3A (i.e., Bonds A, B and C), Bonds A and B and Bonds A and C will have greater covariance in price over the predetermined time window. In other words, the bond price of Bond A changes independently of the bond price of Bond B or Bond C, over the predetermined time window. This will result in the Pearson correlation coefficient being close to "0". To the contrary, Bond B and Bond C show similarity in price moving trends over the predetermined time window. This will result in the Pearson correlation coefficient being close to "1." As a result, Bond A will likely show a low value of the Pearson correlation coefficient, particularly assuming that the rest of bonds show price trends that are similar to those of Bond B and Bond C. At the bond level, Bond A will likely be marked at a lower correlation and a high error percentage in the second correlation graph 240. Bond B or Bond C will likely be marked at a higher coefficient and a lower error percentage in the second correlation graph 240.

In some embodiments, a clustering operation is performed by transforming the correlation coefficient ($\rho$) to a distance metric as shown in Equation II below:

$$d = (3 - \rho)/2 \qquad \text{Equation II}$$

If the correlation coefficient ($\rho$) is 1 which means perfect correlation between a pair of bonds, a distance d will have a value of "1." If bonds are determined to have a distance metric having a value closer to "1," such bonds will likely belong to the current cluster. On the other hand, if bonds are determined to have a distance metric being greater than "1," such bonds will unlikely belong to the current cluster. Based on the distance metric, new clustering can be constructed. Using the example above, the distance metric of Bonds B and C is smaller than the distance metric of Bonds A and B or Bonds A and C.

As a result of the identification of the relationship between the model performance and the intra-cluster correlation, the trend correlation module 225 generates the first correlation graph at the cluster level 235 and the second correlation graph at the bond level 240 with respect to the bonds that have been determined to have the occurrence of the one or more price prediction errors. Additionally, or alternatively, the trend correlation module 225 generates the first correlation graph 235 and the second correlation graph 240 with respect to all of the bonds. Overall, the first correlation graph 235 and the second correlation graph 240 will show trends of a higher correlation level associated with a lower error percentage and a lower correlation level associated with a higher error percentage.

In addition to the correlation at the bond level, the correlation at the cluster level is considered. For instance, at the cluster level, the target cluster including Bonds A, B, and C, will likely have a lower level of correlation in light of the grouping of Bond A with the rest of bonds. The lower level of correlation in the cluster due to Bond A may lose coverage for all bond in the cluster. In the first correlation graph 235, the target cluster including Bonds A, B, and C will likely be marked accordingly. If a cluster contains a bond that is very uncorrelated with the rest, training might not converge which may result in losing bond coverage for all bonds in the cluster. In other words, the higher the correlation is, the smaller the error becomes. Likewise, within a target cluster, as the correlation coefficient value of a bond with respect to the rest of bond becomes higher, the error percentage becomes lower. The correlation coefficient value at the bond level also ranges between 0 and 1. In some embodiments, at the cluster level, an average bond price error percentage and an average correlation coefficient are computed based on bond price error percentages and correlation coefficients of all of the bond included in the cluster.

In some embodiments, once the relationship between the performance and the intra-cluster correlation is identified, the error analysis module 230 analyzes the determined errors by using a plurality of thresholds. The error analysis module 230 receives a cluster error threshold and a cluster correlation threshold and a bond error threshold and a bond correlation threshold. In some embodiments, these cluster and bond thresholds may be provided from users who control information relating to bond data and predetermined or preset. For instance, users may provide threshold values such as the cluster correlation threshold (e.g., 0.4), the cluster error threshold (e.g., 13%), the bond correlation threshold (e.g., 0.39), the bond error threshold (e.g., 9%), etc. The error analysis module 230 determines whether one or more bonds in a selected cluster satisfy the bond error threshold and the bond correlation threshold as depicted with a graph 250 in FIG. 2.

As depicted in the graph 250, a Bond D group and a Bond E group do not satisfy the predetermined bond error threshold, the predetermined bond correlation threshold, or both. The error analysis module 230 may determine that the presence of the Bond D group and the Bond E group in the selected cluster may result in the determined error in price prediction. The error analysis module 230 further check whether at the cluster level, the selected cluster satisfies the predetermined cluster relevant thresholds. As shown in a chart 245 of FIG. 2, the selected cluster containing the Bond D group and the Bond E group may not satisfy the predetermined cluster error threshold and the predetermined cluster correlation threshold. By way of example only, the selected cluster is "Chemicals_10Y-BBB" and an average cluster price error is 14% and an average correlation level is 0.09. The correlation level is lower than the cluster correlation threshold and the price error is higher than the cluster error threshold. Therefore, the error analysis module 230 determines that the particular cluster does not satisfy the relevant cluster thresholds. By way of example only, the cluster, "RETAL_10Y_BBB+" has an average price error of 2% and an average correlation level of "0.70," satisfying the relevant thresholds. The error analysis module 230 determines that the performance of the cluster, "RETAL_10Y_BBB+" is satisfactory.

The error analysis module 230 provides the determination to the clustering module 205 (as shown in 260). The selected cluster may be changed to remove the Bond D group and the Bond E group therefrom. The selected cluster will be constructed with bonds that have higher correlation levels, which may improve intra-cluster correlation of the particular cluster. The higher correlation levels can be determined based on a correlation coefficient closer to "1" or a distance metric closer to "1."

In some embodiments, the removed Bond D group and the Bond E group will be placed in different clusters as depicted in different shapes such as "O", "X" and ☆ in FIG. 2. A correlation coefficient or a distance metric of each bond in the Bond D group and the Bond E group is determined with respect to other bonds in order to find a cluster or clusters where each bond in the Bond D group and the Bond E group can be placed.

Based on the above, new and better clusters are generated and provided to the HMM 210. The HMM 210 performs on the new clusters and the results from the HMM 210 continue to be monitored until all of clusters and all of bonds perform satisfactory with respect to the cluster correlation and error thresholds and the bond correlation and error thresholds. In some embodiments, the trend correlation module 225 and the error analysis module 230 continue to analyze price prediction errors, and then change, adjust or refine the clusters by identifying bonds and clusters that are not satisfying the thresholds.

The resulting clusters 205, after changing, adjusting or refining, are generated as structured datasets representing a second set of clusters. By determining the price prediction errors, analyzing a cause of the price prediction errors, and reconstructing the clusters 205, the resulting clusters 205 include the structured datasets. The structured datasets are provided to the HMM 210 which outputs price predictions with improved accuracy. Moreover, coverage of bonds can be significantly expanded.

An error percentage can be computed with Equation I noted above. The HMM performance based on the first set of clusters shows an average error rate of 5.5%. The HMM performance based on the second set of clusters shows an average error rate of 3.98% which is reduced from the average error rate based on the first set of clusters. Coverage of bonds has increased or expanded significantly from 18.12% to 84.96%. The reduced error rate should be considered in association with the significantly expanded bond coverage.

FIG. 3B depicts an illustrative embodiment of a method 300 in accordance with various aspects described herein. The method 300 implements a machine learning based method for generating structured datasets for use in predicting bond price. The method 300 includes constructing a bond price function of each bond contained in the collection of bond data during a predetermined time window (Step 302). For the time window of interest, the price function can be constructed using pricing tools available in the relevant technical fields by setting a frequency such as every thirty minutes. Then the pricing tools provide bond price at the requested time and a resulting list of such prices at different times can form the price function.

The method 300 further includes training a machine learning model (Step 304). In various embodiments, the machine learning model includes a Hidden Markov Model (HMM) algorithm. In other embodiments, different machine learning models available in the pertinent field can be used and trained with the first set of clusters. At this stage, by way of example, the HMM algorithm, i.e., a supervised machine learning model, is trained with unlabeled or unstructured data (i.e., initial or preliminary clusters). The performance indicator of the HMM algorithm will be used to determine, extract or compute causes for incorrect bond pricing.

The training (Step 304) includes providing the target cluster to the machine learning model, where the target cluster includes a group of bonds having at least one common data feature (Step 306). The training (Step 304) further includes generating a price prediction result of the group of bonds by using the machine learning model (Step 308). In the price prediction, an error occurrence result is determined based on a comparison against the price function of each bond in the group of bonds (Step 310).

At Step 312, a first error percentage and a first correlation coefficient are computed with respect to all of bonds having the occurrence of the error in the price prediction result. At Step 314, a second error percentage and a second correlation coefficient are computed with respect to the target cluster. By way of example, the first correlation coefficient and the second correlation coefficient correspond to a Pearson correlation coefficient with respect to each pair of bonds included in the target cluster.

The training (Step 304) further includes determining whether the first error percentage exceeds a predetermined bond error threshold and the first correlation coefficient exceeds a predetermined bond correlation threshold (Step 316) and generating a feedback output identifying one or more bonds that have determined to exceed the predetermined bond error threshold, the predetermined bond correlation threshold or both (Step 318). Additionally, the method 300 further includes determining whether the second error percentage exceeds a predetermined cluster error threshold and the first correlation coefficient exceeds a predetermined cluster correlation threshold. Another feedback output is generated to identify that the target cluster has been determined to exceed the predetermined cluster error threshold, the predetermined cluster correlation threshold or both.

The method 300 further includes, based on the feedback output, reclustering the one or more bonds from the target cluster (Step 320). As a result, the method 300 includes generating structured datasets including the reclustered target cluster (Step 322). The generated structured datasets reflect and represent reasons for reclustering. Additionally, the method 300 includes providing the generated structured datasets to the trained Hidden Markov Model algorithm, thereby improving accuracy of the price prediction and expanding coverage of bonds. For instance, if a cluster includes one uncorrelated bond, training may not converge and the rest of bonds in that cluster may be lost from the coverage. Additionally, the method includes constructing one or more new clusters including the reclustered one or more bonds. The generated structured datasets (Step 322) further includes the one or more new clusters. Additionally, the Pearson correlation coefficient (ρ) described above can be transformed into a distance metric (d) using Equation II described above. Based on the distance metric (d), determining the identified one or more bonds to be removed from the target cluster or to be placed in a new cluster.

Additionally, as described in connection with FIG. 2, the method 300 includes receiving raw data representing a collection of bond data. Each bond data includes a plurality of data fields, such as a maturity date, industry groups, S&P ratings, etc. The method 300 further includes preprocessing each bond data to extract one or more features from the plurality of data fields. The collection of bond data is partitioned into a first set of clusters. In some embodiments, the first set of clusters can be constructed based on predetermined rules such as common features of bonds such as tickers, the same S&P rating and the same maturity date, etc. Additionally, or alternatively, the first of set of clusters can be construed to capture similarity in trading trends.

In various embodiments, the first set of clusters can include unlabeled data or unstructured data. One or more clusters of the first set of clusters include bonds that may share some features but potentially have different features. In other embodiments, one or more clusters of the first set of clusters include some outliers with respect to the rest of bonds in some clusters, as depicted in FIG. 3A. Accordingly, one or more clusters of the first set of clusters may include uncorrelated elements and intra-cluster correlation may vary. Some of the first set of clusters can have a high level of intra-cluster correlation, but others of the first set of clusters may have a lower level of intra-cluster correlation.

FIG. 4 depicts an illustrative embodiment of another method in accordance with various aspects described herein. The method 500 is directed to a machine learning based process using structured or labeled data. In some embodiments, the structured or labeled data are generated by the method 300 as depicted in FIG. 3. Step 322 of FIG. 3 includes generating structured datasets as described above. In various embodiments, the method 400 includes providing, as input data, new clusters (e.g. Step 322) to a machine learning model (Step 402). The machine learning model includes a Hidden Markov Model (HMM) algorithm, or other AI algorithms available in the art.

Based on the new clusters, the machine learning model obtains price prediction output (Step 404). The method further includes determining whether the price prediction output have error(s) (Step 406). Upon determination of occurrence of the error(s), the method 400 proceeds to Step 312 of FIG. 3. As described above in connection with FIG. 3, the determination, analysis or review of the error(s) follow at Steps 310, 312, 314, 316 and 318. Upon determination of no occurrence of error(s), a training data set including the new clusters as input data and the price prediction output as output data is constructed (Step 408). With the training data set, another machine learning model is trained (Step 410). The constructed training data set may be used to train other AI price prediction algorithms including and not limited to the HMM algorithm.

FIG. 5 depicts an illustrative embodiment of another method in accordance with various aspects described herein. The method 500 incudes constructing a price function of each bond contained in a target cluster during a predetermined time window (Step 502). The method 500 further includes training a machine learning model (Step 504) which includes training a Hidden Markov Model algorithm. The training (Step 504) further includes providing the target cluster to the machine learning model (Step 506). The target cluster includes at least three bonds having at least one common data feature, and respective price functions of a first bond and a second bond among the at least three bonds follow substantially similar trends. The training (Step 504) includes generating a price prediction result of the at least three bonds by using the machine learning model (Step 508), computing a first correlation coefficient between the first and the second bonds (Step 510) and computing a second correlation coefficient between the first bond and a third bond or between the second bond and the third bond (Step 512).

The training (Step 504) further includes determining that the first correlation coefficient and the second correlation coefficient exceed a predetermined bond correlation threshold, respectively (step 514). As a result, a feedback output identifying the third bond that has determined to exceed the predetermined bond correlation threshold is generated (Step 516). The method 500 includes, based on the feedback output, removing the third bond from the target cluster (Step 518). Structured datasets are generated which include the target cluster having the first bond and the second bond and a new cluster having the third bond.

Figure 6:
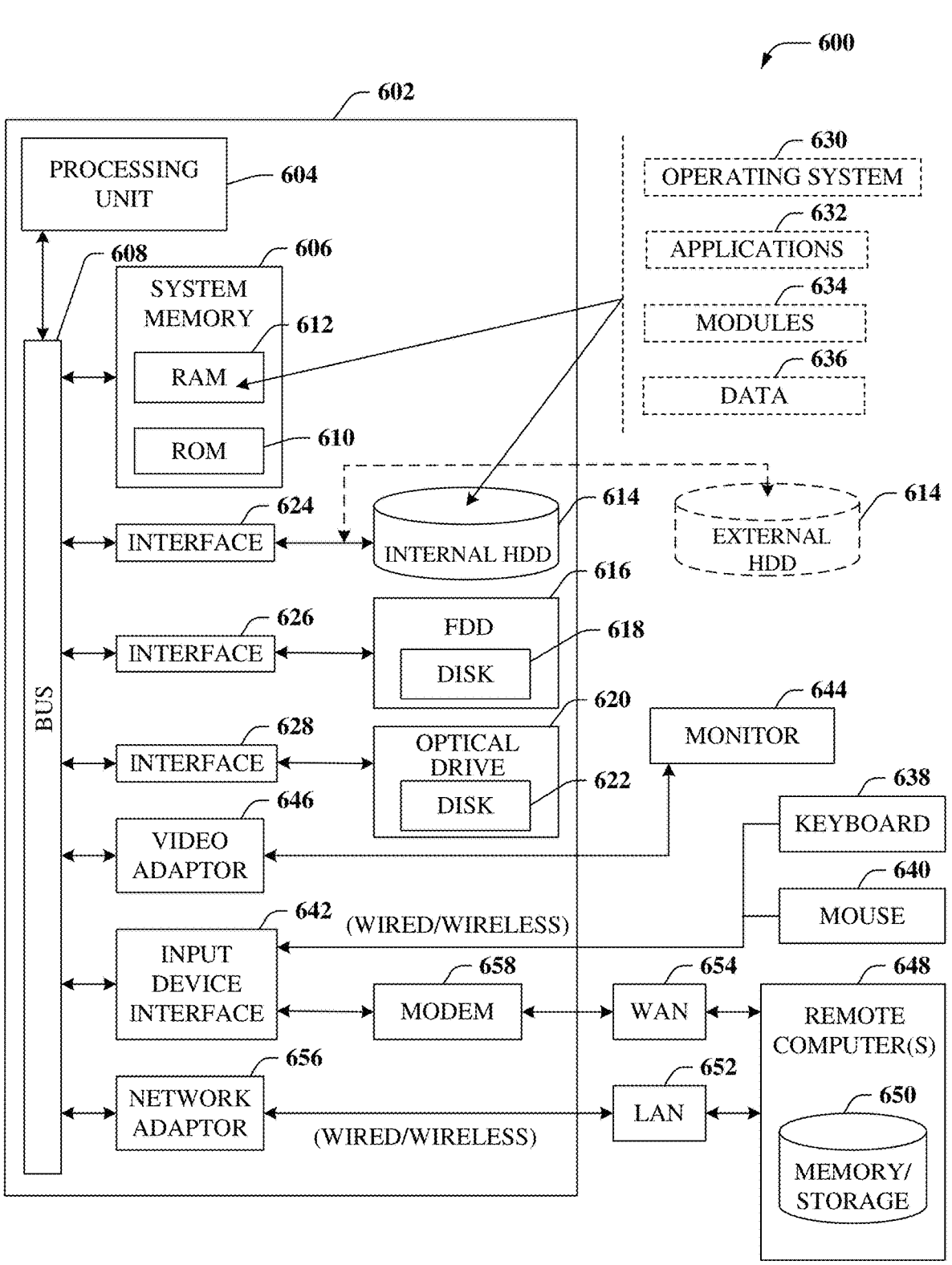
FIG. 6 is a block diagram of an example, non-limiting embodiment of a computing environment of a processing system in accordance with various aspects described herein.

FIG. 6 is a block diagram of an example, non-limiting embodiment of a computing environment of the processing system 152 in accordance with various aspects described herein.

In order to provide additional context for various embodiments of the embodiments described herein, FIG. 6 and the following discussion are intended to provide a brief, general description of a suitable computing environment 600 in which the various embodiments of the processing system 152 can be implemented. For example, computing environment 600 can facilitate in whole or in part machine-learning based systems and methods for generating structured datasets for predicting bond price. Additionally, the computing environment 600 can facilitate in whole or in part the client computing equipment 102, 104, 106 and 108, some equipment included in the cloud platform 160 and the edge platform 170 as depicted in FIG. 1.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment can comprise a computer 602, the computer 602 comprising a processing unit 604, a system memory 606 and a system bus 608. The system bus 608 couples system components including, but not limited to, the system memory 606 to the processing unit 604. The processing unit 404 can be any of various commercially available processors. Dual microprocessors and other multiprocessor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 612 can also comprise a high-speed RAM such as static RAM for caching data.

The computer 602 further comprises an internal hard disk drive (HDD) 614 (e.g., EIDE, SATA), which internal HDD 614 can also be configured for external use in a suitable chassis (not shown), a magnetic floppy disk drive (FDD) 616, (e.g., to read from or write to a removable diskette 618) and an optical disk drive 620, (e.g., reading a CD-ROM disk 422 or, to read from or write to other high-capacity optical media such as the DVD). The HDD 614, magnetic FDD 616 and optical disk drive 620 can be connected to the system bus 608 by a hard disk drive interface 624, a magnetic disk drive interface 626 and an optical drive interface 628, respectively. The hard disk drive interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A user can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. It will also be appreciated that in alternative embodiments, a monitor 644 can also be any display device (e.g., another computer having a display, a smart phone, a tablet computer, etc.) for receiving display information associated with computer 602 via any communication means, including via the Internet and cloud-based networks. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a remote memory/storage device 650 is illustrated. The logical connections depicted comprise wired/wireless connectivity to a local area network (LAN) 652 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the LAN 652 through a wired and/or wireless communication network interface or adapter 656. The adapter 656 can facilitate wired or wireless communication to the LAN 652, which can also comprise a wireless AP disposed thereon for communicating with the adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

While for purposes of simplicity of explanation, the respective processes are shown and described as a series of blocks in FIGS. 3B-5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium, comprising executable instructions that, when executed by a processing system including a processor, facilitate performance of operations, the operations comprising:

storing collection of bond data identified and sorted based on a set of extractable features;

preprocessing the bond data by extracting the set of extractable features and partitioning the bond data into a plurality of bond clusters, wherein each volume of the bond data and the plurality of bond clusters correspond to daily trading volume that cannot be manually handled;

constructing a price function of each bond data contained in each of a plurality of bond clusters including a target cluster during a predetermined time window;

training a machine learning model by:

providing the target cluster to the machine learning model, wherein the target cluster comprises a bond dataset having at least one common data feature;

generating a price prediction result of the bond dataset by using the machine learning model;

determining occurrence of an error in the price prediction result based on a comparison against the price function of each bond data in the bond dataset;

upon the occurrence of the error in the price prediction result, identifying a cause that has resulted in the error in the price prediction result, wherein the cause includes a presence of one or more bond data in the bond dataset having a data feature deviated from remaining bond data in the bond dataset during the predetermined time window, wherein the identifying the cause further comprises identifying the cause by:

computing a first error percentage and a first correlation coefficient with respect to all of bond data in the bond dataset having the occurrence of the error in the price prediction result, wherein computing the first correlation coefficient further comprises computing the first correlation coefficient with respect to each pair of bond data and correlation of pricing trends of each pair of bond data;

determining whether the first error percentage exceeds a predetermined bond error threshold and the first correlation coefficient exceeds a predetermined bond correlation threshold; and generating a feedback output identifying a resultant bond data in the bond dataset that have been determined to exceed the predetermined bond error threshold, the predetermined bond correlation threshold or both; and based on the feedback output, reclustering the target cluster by including the resultant bond data and excluding the remaining bond data other than the resultant bond data resulting in a reclustered target cluster;

generating structured datasets including the reclustered target cluster;

providing the structured datasets to the machine learning model to generate a bond price prediction for a bond based on the structured datasets;

obtaining the a bond price prediction for the bond based on the structured datasets from the machine learning model;

determining a presence or absence of an error in the bond price prediction for the bond based on the structured datasets;

repeating the constructing, the training, the reclustering and the generating of the structured datasets to obtain adjusted structured datasets and providing the adjusted structured datasets to the machine learning model until the absence of the error in the bond price prediction is determined, wherein the repeating of the constructing, the training, the reclustering and the generating are automated and performed by a machine including the processing system; and purchasing the bond based on the bond price prediction.

2. The non-transitory machine-readable medium of claim 1, wherein the training the machine learning model further comprises training a Hidden Markov Model algorithm resulting in a trained Hidden Markov Model.

3. The non-transitory machine-readable medium of claim 2, wherein the operations further comprise providing the generated structured datasets to the trained Hidden Markov Model algorithm.

4. The non-transitory machine-readable medium of claim 1, wherein the operations further comprise constructing one or more new clusters including the reclustered target cluster, and wherein the generating the structured datasets further comprises generating the structured datasets including the one or more new clusters.

5. The non-transitory machine-readable medium of claim 4, wherein the training the machine learning model further comprises:

computing a second error percentage and a second correlation coefficient with respect to the target cluster;

determining whether the second error percentage exceeds a predetermined cluster error threshold and the second correlation coefficient exceeds a predetermined cluster correlation threshold; and generating another feedback output identifying that the target cluster has been determined to exceed the predetermined cluster error threshold, the predetermined cluster correlation threshold or both.

6. The non-transitory machine-readable medium of claim 1, wherein the computing the first correlation coefficient further comprises computing a Pearson correlation coefficient with respect to each pair of bonds included in the target cluster.

7. The non-transitory machine-readable medium of claim 6, wherein the training the machine learning model further comprises:

transforming the Pearson correlation coefficient ($\rho$) into a distance metric (d) using the following equation:

$$d = (3 - \rho)/2;$$

and based on the distance metric (d), determining the remaining bond data to be removed from the target cluster or to be placed in a new cluster.

8. A method, comprising:

storing, by a processing system including a processor, collection of bond data identified and sorted based on a set of extractable features;

preprocessing, by the processing system, the bond data by extracting the set of extractable features and partitioning the bond data into a plurality of bond clusters, wherein each volume of the bond data and the plurality of bond clusters correspond to daily trading volume that cannot be manually handled;

constructing, by the processing system, a price function of each bond contained in the plurality of bond clusters including a target cluster during a predetermined time window;

training, by the processing system, a machine learning model by:

providing the target cluster to the machine learning model, wherein the target cluster comprises a bond dataset having at least one common data feature;

generating a price prediction result of the bond dataset by using the machine learning model;

determining occurrence of an error in the price prediction result based on a comparison against the price function of each bond data in the bond dataset;

upon the occurrence of the error in the price prediction result, identifying a cause that has resulted in the error in the price prediction result, wherein the cause includes a presence of one or more bond data in the bond dataset having a data feature deviated from remaining bond data in the bond dataset during the predetermined time window, wherein the identifying the cause comprises identifying the cause by:

computing a first error percentage and a first correlation coefficient with respect to all of bond data in the bond dataset having the occurrence of the error in the price prediction result, wherein computing the first correlation coefficient further comprises computing the first correlation coefficient with respect to each pair of bond data and correlation of pricing trends of each pair of bond data; and computing a second error percentage and a second correlation coefficient with respect to the target cluster;

determining whether the first error percentage exceeds a predetermined bond error threshold and the first correlation coefficient exceeds a predetermined bond correlation threshold;

determining whether the second error percentage exceeds a predetermined cluster error threshold and the second correlation coefficient exceeds a predetermined cluster correlation threshold; and generating a feedback output identifying a resultant bond data in the bond dataset that have been determined to exceed the predetermined bond error threshold, the predetermined bond correlation threshold or both; and based on the feedback output, reclustering, by the processing system, the target cluster by including the resultant bond data and excluding the remaining bond data other than the resultant bond data resulting in a reclustered target cluster, and generating one or more new clusters including the reclustered target cluster;

generating, by the processing system, structured datasets including the reclustered target cluster and the one or more new clusters;

providing the structured datasets to the machine learning model to generate a bond price prediction for a bond based on the structured datasets;

obtaining generating a bond price prediction for the bond based on the structured datasets from the machine learning model;

determining a presence or absence of an error in the bond price prediction for the bond based on the structured datasets;

repeating the constructing, the training, the reclustering and the generating of the structured datasets to obtain adjusted structured datasets and providing the adjusted structured datasets to the machine learning model until the absence of the error in the bond price prediction is determined, wherein the repeating of the constructing, the training, the reclustering and the generating are automated and performed by a machine including the processing system; and purchasing a bond based on the bond price prediction.

9. The method of claim 8, wherein the training the machine learning model further comprises training a Hidden Markov Model algorithm.

10. The method of claim 8, further comprises wherein the computing the second error percentage further comprises computing an average error percentage of each bond included in the target cluster and the computing the second correlation coefficient further comprises computing an average correlation coefficient of each bond included in the target cluster.

11. The method of claim 8, wherein the computing the first correlation coefficient further comprises computing a Pearson correlation coefficient with respect to each pair of bonds included in the target cluster.

12. The method of claim 11, wherein the training the machine learning model further comprises:

transforming the Pearson correlation coefficient (p) into a distance metric (d); and based on the distance metric (d), determining the resultant bond data in the bond dataset to be removed from the target cluster or to be placed in the one or more new clusters.

13. A device, comprising:

a processing system including a processor; and a memory that stores executable instructions that, when executed by the processing system, facilitate performance of operations, the operations comprising:

storing collection of bond data identified and sorted based on a set of extractable features;

preprocessing the bond data by extracting the set of extractable features and partitioning the bond data into a plurality of bond clusters, wherein each volume of the bond data and the plurality of bond clusters correspond to daily trading volume that cannot be manually handled;

constructing a price function of each bond data contained in a target cluster during a predetermined time window;

training a machine learning model by:

providing the target cluster to the machine learning model, wherein the target cluster comprises at least three bond data having at least one common data feature, wherein respective price functions of a first bond data and a second bond data among the at least three bond data follow substantially consistent trends;

generating a price prediction result of the at least three bond data by using the machine learning model;

upon an occurrence of an error in the price prediction result, identifying a cause that has resulted in the error in the price prediction result, wherein the cause includes a presence of one or more bond data having a data feature deviated from remaining bond data during the predetermined time window, wherein the identifying the cause comprises identifying the cause by:

computing a first correlation coefficient between the first and the second bond data with respect to correlation of pricing trends of the first and the second bond data;

computing a second correlation coefficient between the first bond data and a third bond data with respect to correlation of pricing trends of the first and the third bond data, or between the second bond data and the third bond data with respect to correlation of pricing trends of the second and the third bond data;

determining that the first correlation coefficient and the second correlation coefficient exceed a predetermined bond correlation threshold, respectively;

generating a feedback output identifying the third bond data that has been determined to exceed the predetermined bond correlation threshold;

based on the feedback output, removing the third bond data from the target cluster; and generating structured datasets including the target cluster having the first bond data and the second bond data and a new cluster having the third bond data;

providing the structured datasets to the machine learning model to generate a bond price prediction for a bond based on the structured datasets;

obtaining a bond priced prediction for the bond based on the structure datasets;

determining a presence or absence of an error in the bond price prediction for the bond based on the structured datasets;

repeating the constructing, the training, the removing and the generating of the structured datasets to obtain adjusted structured datasets and providing the adjusted structured datasets to the machine learning model until the absence of the error in the bond price prediction is determined, wherein the repeating of the constructing, the training, the removing and the generating are automated and performed by a machine including the processing system; and purchasing the bond based on the bond price prediction.

14. The device of claim 13, wherein the machine learning model comprises a Hidden Markov Model algorithm.

15. The device of claim 14, wherein the operations further comprise:

providing the structured datasets to the Hidden Markov Model algorithm; and generating price prediction results of the target cluster and the new cluster.

16. The device of claim 13, wherein the training the machine learning model further comprises:

determining occurrence of an error in the price prediction result based on a comparison against the price function of each bond;

computing an error percentage with respect to each bond having the occurrence of the error in the price prediction result; and determining whether the computed error percentage exceeds a predetermined bond error threshold; and wherein the generating the feedback output further comprises generating the feedback output identifying all of bonds that have been determined to exceed the predetermined bond error threshold.

17. The device of claim 13, wherein:

the computing the first correlation coefficient further comprises computing a Pearson correlation coefficient with respect to the first bond data and the second bond data; and the computing the second correlation coefficient further comprises computing the Pearson correlation coefficient with respect to the first bond data and the third bond data or with respect to the second bond data and the third bond data.

18. The device of claim 17, wherein the training the machine learning model further comprises transforming the Pearson correlation coefficient (p) into a distance metric (d); and based on the distance metric (d), determining a new cluster to place the removed third bond data.

19. The device of claim 13, wherein the first correlation coefficient is greater than the second correlation coefficient.

20. The device of claim 18, wherein the distance metric (d) of the first and the second bond data is smaller than the distance metric (d) of the first and the third bond data and the distance metric (d) of the second and the third bond data.

* * * * *